United States Patent
Hattori

(10) Patent No.: US 10,475,198 B2
(45) Date of Patent: Nov. 12, 2019

(54) MICROSCOPE SYSTEM AND SPECIMEN OBSERVATION METHOD

(71) Applicant: OLYMPUS CORPORATION, Hachioji-shi, Tokyo (JP)

(72) Inventor: Toshiyuki Hattori, Tokyo (JP)

(73) Assignee: OLYMPUS CORPORATION, Tokyo (JP)

(*) Notice: Subject to any disclaimer, the term of this patent is extended or adjusted under 35 U.S.C. 154(b) by 224 days.

(21) Appl. No.: 15/431,215

(22) Filed: Feb. 13, 2017

(65) Prior Publication Data

US 2017/0278259 A1    Sep. 28, 2017

(30) Foreign Application Priority Data

Mar. 25, 2016    (JP) .................................. 2016-061544

(51) Int. Cl.
*G06T 7/593* (2017.01)
*G02B 21/36* (2006.01)

(52) U.S. Cl.
CPC ............ *G06T 7/593* (2017.01); *G02B 21/365* (2013.01); *G02B 21/367* (2013.01); *G06T 2207/10012* (2013.01); *G06T 2207/10056* (2013.01)

(58) Field of Classification Search
None
See application file for complete search history.

(56) References Cited

U.S. PATENT DOCUMENTS

| | | | | |
|---|---|---|---|---|
| 5,684,890 A | * | 11/1997 | Miyashita | .............. G06T 7/70 382/154 |
| 2004/0109169 A1 | | 6/2004 | Olschewski | |
| 2005/0280818 A1 | | 12/2005 | Yamashita et al. | |
| 2010/0083410 A1 | | 4/2010 | Hattori et al. | |
| 2012/0243080 A1 | | 9/2012 | Hattori et al. | |
| 2014/0193096 A1 | * | 7/2014 | Hasegawa | ........... G06K 9/4633 382/281 |
| 2015/0160450 A1 | * | 6/2015 | Ou | ...................... G02B 21/002 348/80 |

(Continued)

FOREIGN PATENT DOCUMENTS

| | | |
|---|---|---|
| JP | 2010085420 A | 4/2010 |
| JP | 2012203048 A | 10/2012 |
| WO | 2014165989 A1 | 10/2014 |

OTHER PUBLICATIONS

Extended European Search Report (EESR) dated Jul. 28, 2017 issued in counterpart European Application No. 17157339.7.

(Continued)

*Primary Examiner* — Frederick D Bailey
(74) *Attorney, Agent, or Firm* — Holtz, Holtz & Volek PC

(57) ABSTRACT

A three-dimensional image is easily, quickly, and efficiently acquired, regardless of the shape of a specimen or other factors. The present invention provides a microscope system including: a microscope that acquires an image of a specimen; a reference-shape setting portion that sets an approximate shape of the specimen; an observation-area estimating portion that sets a three-dimensional observation area of the specimen according to the reference shape set by the reference-shape setting portion; and a control unit that controls the microscope so as to acquire a three-dimensional observation image of the observation area set by the observation-area estimating portion.

4 Claims, 9 Drawing Sheets

(56) References Cited

U.S. PATENT DOCUMENTS

2016/0062101 A1    3/2016   Weiss et al.
2017/0039723 A1*   2/2017   Price .................... G06K 9/6215
2017/0116715 A1*   4/2017   Takayama .......... H04N 5/23212
2017/0199362 A1*   7/2017   Schwedt ............ G02B 21/0032

OTHER PUBLICATIONS

Corbin, "Setting up Micro-Magellan for Device control", XP055390701, Oct. 23, 2015, <http://biomicroscopy.ucsf.edu/mediawiki/images/6/62/Micro-MagellanUserGuide.pdf>.

Peng, et al., "Virtual finger boosts three-dimensional imaging and microsurgery as well as terabyte volume image visualization and analysis", Nature Communications, vol. 5, Jul. 11, 2014, DOI: 10.0138/ncomms5342.

Pinkard, et al., "Micro-Magellan: A flexible open source acquisition software for high throughput biological light microscopy", XP055391349, DOI: 10.1101/038117, Jan. 28, 2016 <http://www.biorxiv.org/content/early/2016/01/28/038117>.

Tischer, et al., "Adaptive fluorescence microscopy by online feedback image analysis", Methods in Cell Biology, 2014, vol. 123, Jun. 25, 2014, US, XP055391351, pp. 489-503.

European Office Action dated May 17, 2019 issued in counterpart European Application 17157339.7.

Anonymous, "Using Regions of Interest (RIO's)", XP055587941,Retrieved from the Internet: URL: https://web.archive.org/web/20151006201729/http://amidesourceforge.net/help/C/ar01s05.html, Oct. 6, 2015.

Ansari, et al., "Quantitative 3D Cell-Based Assay Performed with Cellular Spheroids and Fluorescence Microscopy", Laboratory Methods in Cell Biology: Imaging; [Methods in Cell Biology ISSN0091-679X],Amsterdam [U.A.]: ELSEVIER/ACAD.PRESS, NL, Jan. 1, 2013, pp. 295-309, XP008173434, ISBN: 978-0-12-407239-8.

\* cited by examiner

MICROSCOPE SYSTEM AND SPECIMEN OBSERVATION METHOD

CROSS-REFERENCE TO RELATED APPLICATIONS

This application is based on Japanese Patent Application No. 2016-061544, the contents of which are incorporated herein by reference.

TECHNICAL FIELD

The present invention relates to a microscope system and a specimen observation method.

BACKGROUND ART

In recent years, as a result of the development of three-dimensional culturing technology and clearing technology, the need for microscopes that enable three-dimensional observation of a wide field of view is increasing. A known example of such microscopes is disclosed in PTL 1. In the microscope system disclosed in PTL 1, a plurality of partial image groups with various image-acquisition positions in the depth direction of the specimen are acquired only at the position where a specimen container is mounted, and the plurality of partial image groups are combined into a map image.

CITATION LIST

Patent Literature

{PTL 1} Japanese Unexamined Patent Application, Publication No. 2010-085420

SUMMARY OF INVENTION

Technical Problem

An object of the present invention is to provide a microscope system and a specimen observation method that enable easy, quick, and efficient acquisition of a three-dimensional image, regardless of the shape of a specimen or other factors.

Solution to Problem

An aspect of the present invention provides a microscope system including: a microscope that acquires an image of a specimen; an approximate-shape setting portion that sets an approximate shape of the specimen; an observation-area setting portion that sets a three-dimensional observation area of the specimen according to the approximate shape set by the approximate-shape setting portion; and a control unit that controls the microscope so as to acquire a three-dimensional observation image of the observation area set by the observation-area setting portion.

In the above-described aspect, the approximate-shape setting portion may set the approximate shape of the specimen from parameters of a spherical or a spheroidal shape that includes substantially the entirety of the specimen.

In the above-described aspect, the approximate-shape setting portion may estimate the approximate shape of the specimen on the basis of a reference image of the specimen acquired by the microscope.

In the above-described aspect, the approximate-shape setting portion may estimate the approximate shape of the specimen on the basis of a reference image of the specimen stored in a predetermined recording medium.

In the above-described aspect, the control unit may control the microscope so as to acquire a three-dimensional reference image of the specimen at a first resolution and may control the microscope so as to acquire a three-dimensional observation image of the observation area at a second resolution that is higher than the first resolution.

In the above-described aspect, the observation-area setting portion may define, as the observation area, an area in the reference image where the specimen exists in every observation field of view in the observation image.

In the above-described aspect, in time-lapse observation, the approximate-shape setting portion may use any one of previously acquired reference images.

In the above-described aspect, the control unit may control the microscope so as to acquire the observation image while changing the position at a smaller pitch, in a stepwise manner, in the depth direction of the specimen than in the reference image.

In the above-described aspect, the control unit may control the microscope so as to acquire the observation image at a higher resolution in a direction intersecting the depth direction of the specimen than in the reference image.

In the above-described aspect, the control unit may control the microscope so as to acquire the observation image having a higher signal-to-noise ratio than the reference image.

In the above-described aspect, the microscope may include a scanning part that two-dimensionally scans excitation light across the specimen, and the control unit may control the scanning part so as to acquire the observation image at a lower scanning speed than the excitation-light scanning speed when the reference image is acquired.

In the above-described aspect, the observation-area setting portion may define, as the observation area, an area obtained by three-dimensionally adding a predetermined value to the approximate shape.

Another aspect of the present invention provides a specimen observation method used for a microscope system comprising a control unit that controls so as to acquire a three-dimensional observation image of a specimen. The specimen observation method including a processes of: setting an approximate shape of the specimen; setting a three-dimensional observation area of the specimen according to the approximate shape; and acquiring the three-dimensional observation image of the three-dimensional observation area.

In the above-described aspect, the approximate shape of the specimen may be set from parameters of a spherical or a spheroidal shape that includes substantially the entirety of the specimen.

In the above-described aspect, the specimen observation method may further include the processes of acquiring a three-dimensional reference image of the specimen at a first resolution. The approximate shape of the specimen may be estimated on the basis of the three-dimensional reference image, and a three-dimensional observation image of the observation area may be acquired at a second resolution that is higher than the first resolution.

DESCRIPTION OF EMBODIMENTS

First Embodiment

A microscope system and a specimen observation method according to a first embodiment of the present invention will be described below with reference to the drawings.

Figure 1:
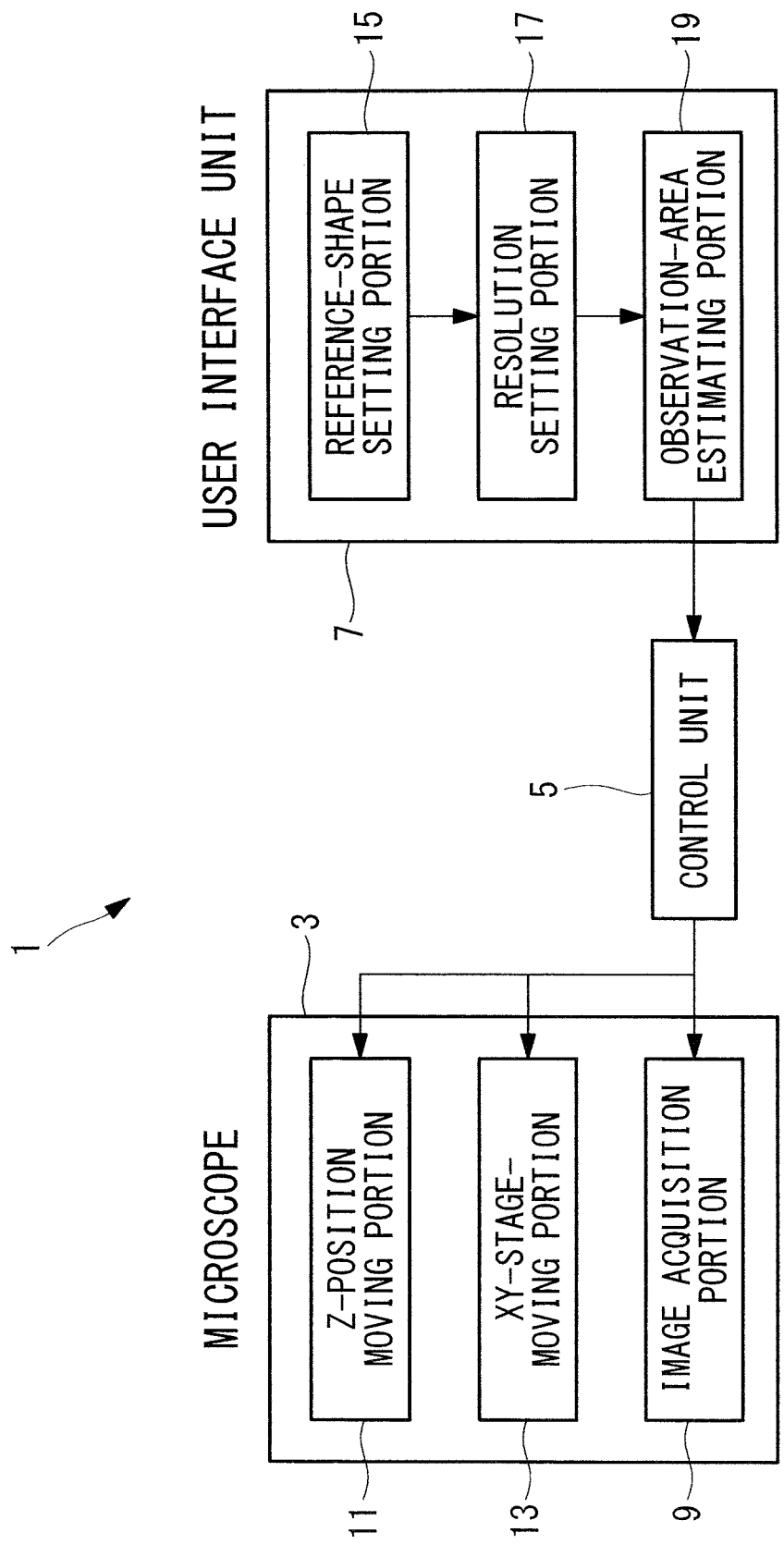
FIG. 1 is a block diagram showing a microscope system according to a first embodiment of the present invention.

As shown in FIG. 1, a microscope system 1 according to this embodiment includes a microscope 3 used to observe a sample S (see FIGS. 2 and 3), a control unit 5 that controls the microscope 3, and a user interface unit 7 through which instructions from a user are input to the control unit 5. Input units (not shown), such as a mouse and a keyboard, through which the user inputs instructions, are connected to the microscope system 1.

The microscope 3 includes an image acquisition portion 9 that acquires an image of the sample S, a Z-position moving portion 11 that changes the observation position in the sample S, and an XY-stage-moving portion 13.

Figure 2:
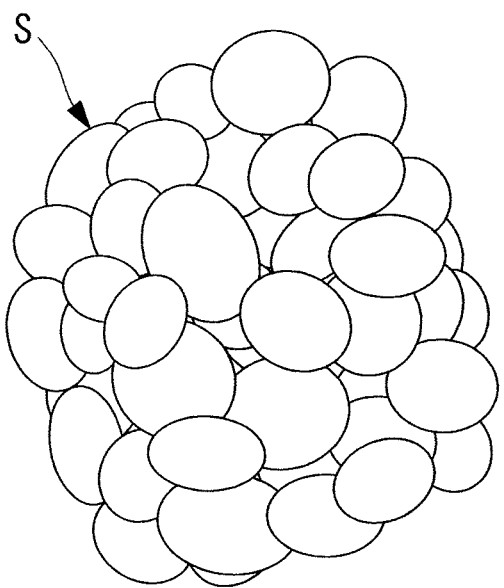
FIG. 2 is a diagram showing an example of a sample.
Figure 3:
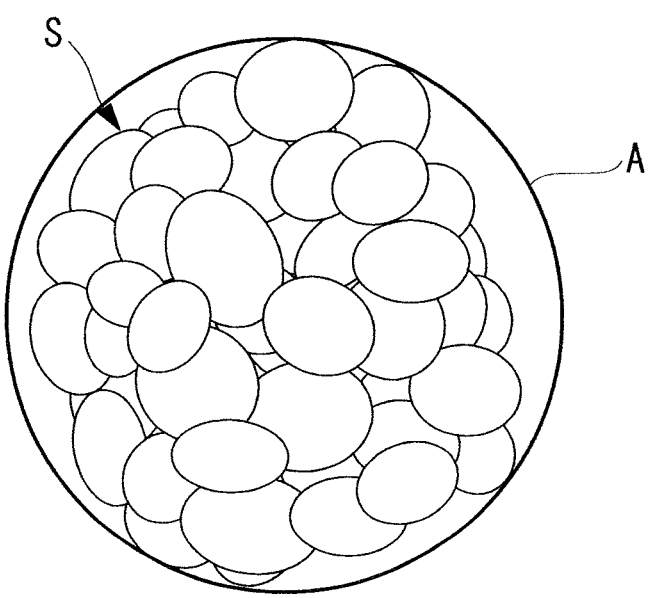
FIG. 3 is a diagram showing an example of a spherical reference shape approximating the shape of the sample in FIG. 2.

The sample S will be described by taking, for example, a cell clump composed of a plurality of cells and having a three-dimensional structure, as shown in FIGS. 2 and 3, as an example.

Although an illustration thereof is omitted, the image acquisition portion 9 includes, for example: an electrically actuated stage on which the sample S is mounted; a light source that emits laser light; a scanner, such as galvanometer mirrors, that two-dimensionally scans the laser light emitted from the light source; a galvano-zoom-magnification adjusting portion that adjusts the observation magnification by increasing or decreasing the scanning area by changing the amplitudes of the galvanometer mirrors; a plurality of objective lenses having different magnifications and each irradiating the sample S with the laser light scanned by the scanner and collecting fluorescence generated in the sample S; a revolver that holds the plurality of objective lenses in such a manner that they are interchangeable; a dichroic mirror that splits off the fluorescence collected by the objective lens from the optical path of the laser light; a detector, such as a photomultiplier tube, that detects the fluorescence split off by the dichroic mirror; and an image generating portion that generates an image of the sample S on the basis of the brightness information of the fluorescence detected by the detector.

The electrically actuated stage is horizontally movable in the X and Y directions along the X-direction and Y-direction movement axes, respectively, which are perpendicular to the optical axis of the objective lens.

The revolver can selectively dispose one objective lens on the optical axis of the laser light. The revolver can move the objective lens that it holds in the Z direction, which is parallel to the optical axis.

Under the control of the control unit 5, the Z-position moving portion 11 finely moves the objective lens held by the revolver in the Z direction. As a result, the Z-direction position of the image acquired by the image acquisition portion 9 (hereinbelow referred to as the "Z position") is moved.

The XY-stage-moving portion 13 includes, for example, two motors and, under the control of the control unit 5, moves the electrically actuated stage in the X and Y directions. As a result, the observation field of view of the image acquisition portion 9 is moved in the X and Y directions.

The user interface unit 7 includes a reference-shape setting portion (approximate-shape setting portion) 15, a resolution setting portion 17, and an observation-area estimating portion (observation-area setting portion) 19.

The reference-shape setting portion 15 sets a spherical or spheroidal (spheroidal is not shown) reference shape (approximate shape) A that includes substantially the entirety of the sample S and that approximates the shape of the sample S, as shown in FIG. 3, according to the parameters of the radius and the coordinates (X, Y, Z) of the central position input by the user.

The resolution setting portion 17 sets the resolution of the image acquisition portion 9 on the basis of the image-capturing conditions input by the user, including, for example, the magnification of the objective lens, the observation magnification adjusted by the galvano-zoom-magnification adjusting portion, the step amount (pitch) of the objective lens in the Z direction, the image size, etc.

Figure 4:
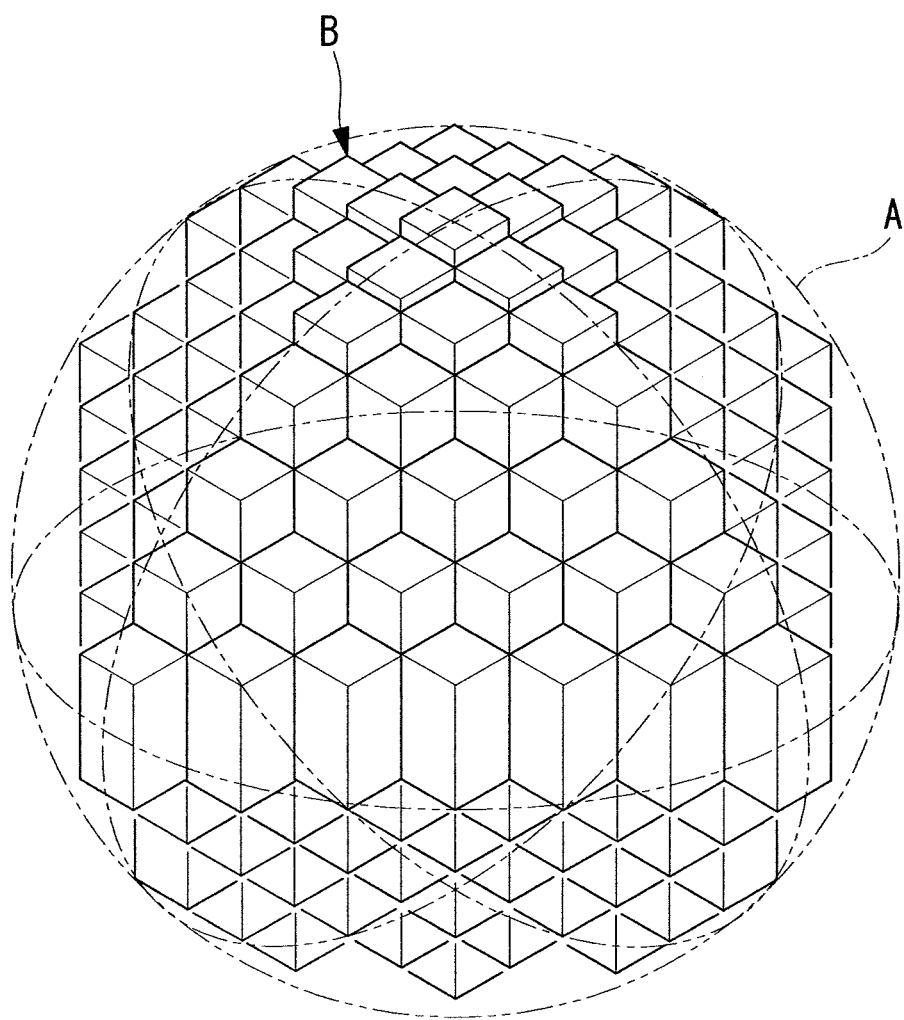
FIG. 4 is a diagram showing an example of an observation area according to the reference shape in FIG. 3.
Figure 4:
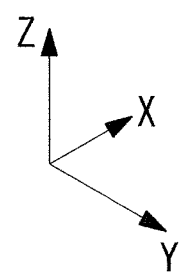

The observation-area estimating portion 19 sets a three-dimensional observation area of the sample S according to the reference shape A set by the reference-shape setting portion 15, on the basis of the resolution of the image acquisition portion 9 set by the resolution setting portion 17. Specifically, as shown in FIG. 4, the observation-area estimating portion 19 sets a three-dimensional observation area B in which each XY position has a specific Z area, so as to follow the outer shape of the reference shape A of the sample S.

The control unit 5 is configured, for example, with a PC (personal computer), and various kinds of control operation executed by the control unit 5 is performed by software executed on a computer. The user interface unit 7 is also configured by a PC, the operation of the reference-shape setting portion 15, the resolution setting portion 17, and the observation-area estimating portion 19 is performed by the corresponding software executed on a computer.

When the user inputs an instruction to start observation, the control unit 5 controls the revolver, the galvano-zoom-magnification adjusting portion, and the like according to the image-capturing conditions input by the user. The control unit 5 controls the XY-stage-moving portion 13 according to the observation area B set with the observation-area estimating portion 19 so as to move the observation field of view of the image acquisition portion 9 in the X and Y directions in the observation area B.

The control unit 5 controls the Z-position moving portion 11 according to the observation area B set with the observation-area estimating portion 19 so as to finely move, in a stepwise manner, the objective lens in the Z direction, at each XY position of the observation field of view of the image acquisition portion 9 in the observation area B, thereby moving the Z position. The control unit 5 controls the image acquisition portion 9 so as to acquire images of the sample S at the respective Z positions at each XY position of the observation field of view of the image acquisition portion 9 in the observation area B.

Figure 5:
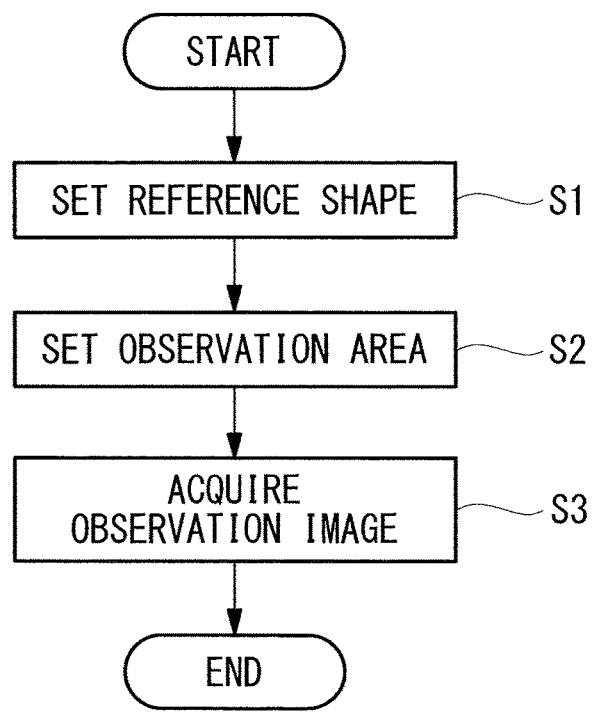
FIG. 5 is a flowchart describing a specimen observation method according to the first embodiment of the present invention.

As shown by the flowchart in FIG. 5, the specimen observation method according to this embodiment includes: a reference-shape setting step (approximate-shape setting step) S1 in which a reference shape of the sample S is set; an observation-area setting step S2 in which a three-dimensional observation area of the sample S is set according to the reference shape set in the reference-shape setting step S1; and an observation-image acquisition step S3 in which a three-dimensional observation image of the observation area set in the observation-area setting step S2 is acquired.

The effects of the thus-configured microscope system 1 and specimen observation method will be described.

To observe a sample S with the microscope system 1 according to this embodiment, first, a user inputs the image-capturing conditions with respect to the sample S, such as the magnification of the objective lens, the observation magnification adjusted by the galvano-zoom-magnification adjusting portion, the step amount of the objective lens in the Z direction, and the image size, and also inputs the parameters of the radius and the coordinates (Z,Y,Z) of the central position for setting the reference shape of the sample S.

Then, the resolution setting portion 17 sets the resolution of the image acquisition portion 9 according to the input image-capturing conditions with respect to the sample S, and the reference-shape setting portion 15 sets a spherical reference shape A that approximates the shape of the sample S, as shown in FIG. 3, according to the input parameters of the reference shape of the sample S (step S1).

Then, the observation-area estimating portion 19 sets a three-dimensional observation area B of the sample S according to the reference shape A set by the reference-shape setting portion 15, on the basis of the resolution of the image acquisition portion 9 set by the resolution setting portion 17 (step S2). In the observation area B of the sample S, as shown in FIG. 4, specific Z areas are set for the respective XY positions, such that the observation area B follows the outer shape of the reference shape A of the sample S.

Then, when the user inputs an instruction to start observation, the control unit 5 controls the XY-stage-moving portion 13 such that the observation field of view of the image acquisition portion 9 is moved to any one of the XY positions within the observation area B of the sample S set with the observation-area estimating portion 19, and the control unit 5 controls the Z-position moving portion 11 so as to move the Z position to a Z-stack starting position at that XY position.

Then, the control unit 5 controls the image acquisition portion 9 such that the laser light emitted from the laser light source is two-dimensionally scanned by the scanner in the X and Y directions and is radiated on the sample S through the objective lens. The fluorescence generated in the sample S as a result of being irradiated with the laser light is collected by the objective lens, returns along the optical path of the laser light, passes via the scanner, is split off from the optical path of the laser light by the dichroic mirror, and is detected by the detector. As a result, the image generating portion generates a slice image of the sample S on the basis of the brightness of the fluorescence detected by the detector.

Then, the control unit 5 controls the Z-position moving portion 11 so as to finely move the objective lens in the Z direction, and the control unit 5 also controls the image acquisition portion 9 so as to acquire a slice image at the Z position after the movement. In this way, as shown in FIG. 5, slice images are acquired at the respective Z positions at a single XY position in the observation area B, while the Z position is shifted by a certain step amount, in a stepwise manner, within the Z area specific to that XY position.

Once the slice images have been acquired at the respective Z positions at that XY position, the observation field of view of the image acquisition portion 9 is moved to the next XY position, where slice images are acquired at the respective Z positions, while the Z position is shifted by a certain step amount, in a stepwise manner, within the Z area specific to that XY position.

Once the slice images have been acquired at the respective Z positions within the specific Z areas at all the XY positions of the observation fields of view within the observation area B, the image generating portion combines the slice images into a three-dimensional image of the sample S in the observation area B (step S3).

As has been described above, in the microscope system and the specimen observation method according to this embodiment, the control unit 5 controls the microscope 3 so as to acquire an observation image of the observation area B that is set according to the reference shape A approximating the shape of the sample S and in which each XY position has a specific Z area. Hence, compared with a case where images of the respective XY positions, in the sample S, having the same Z area are captured such that the entirety of the sample S is included, it is possible to minimize the wasted observation area and to efficiently capture an image of only the necessary area of each sample S. This enables easy, quick, and efficient acquisition of a three-dimensional observation image of the sample S, regardless of the shape of the sample S or other factors. It is also possible to reduce the damage to the specimen.

Second Embodiment

Next, a microscope system according to a second embodiment of the present invention will be described.

Figure 6:
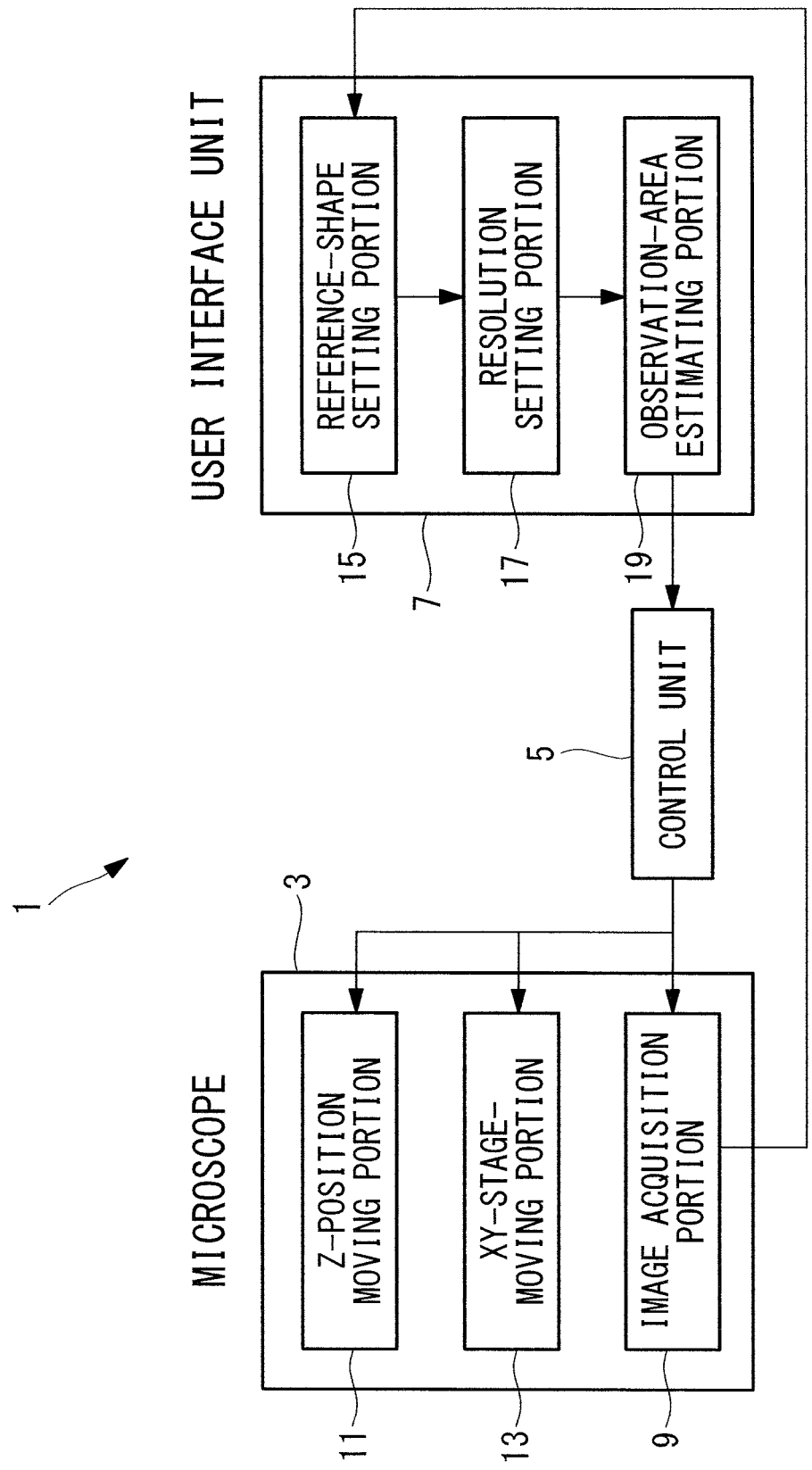
FIG. 6 is a block diagram showing a microscope system according to a second embodiment of the present invention.
Figure 7:
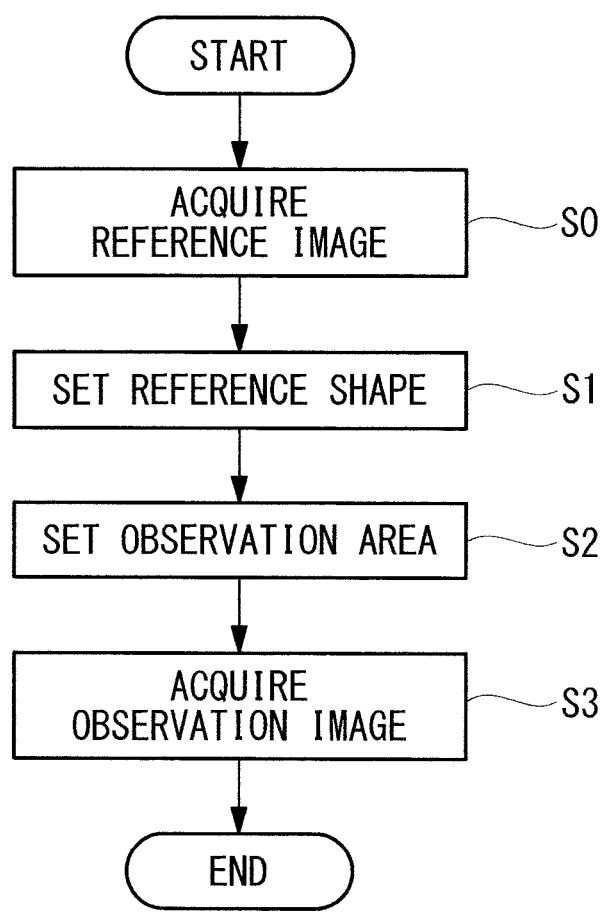
FIG. 7 is a flowchart describing a specimen observation method according to a second embodiment of the present invention.

The microscope system 1 according to this embodiment differs from that according to the first embodiment in that, as shown in FIG. 6, the reference-shape setting portion 15 estimates the reference shape of the sample S on the basis of the reference image of the sample S acquired by the microscope 3. As shown in FIG. 7, the specimen observation method according to this embodiment differs from that according to the first embodiment in that it includes, before the reference-shape setting step S1, a reference-image acquisition step S0 in which a three-dimensional reference image of the sample S is acquired at a first resolution.

Below, portions having configurations common to those of the microscope system 1 and the specimen observation method according to the first embodiment will be denoted by the same reference signs, and the descriptions thereof will be omitted.

Figure 8:
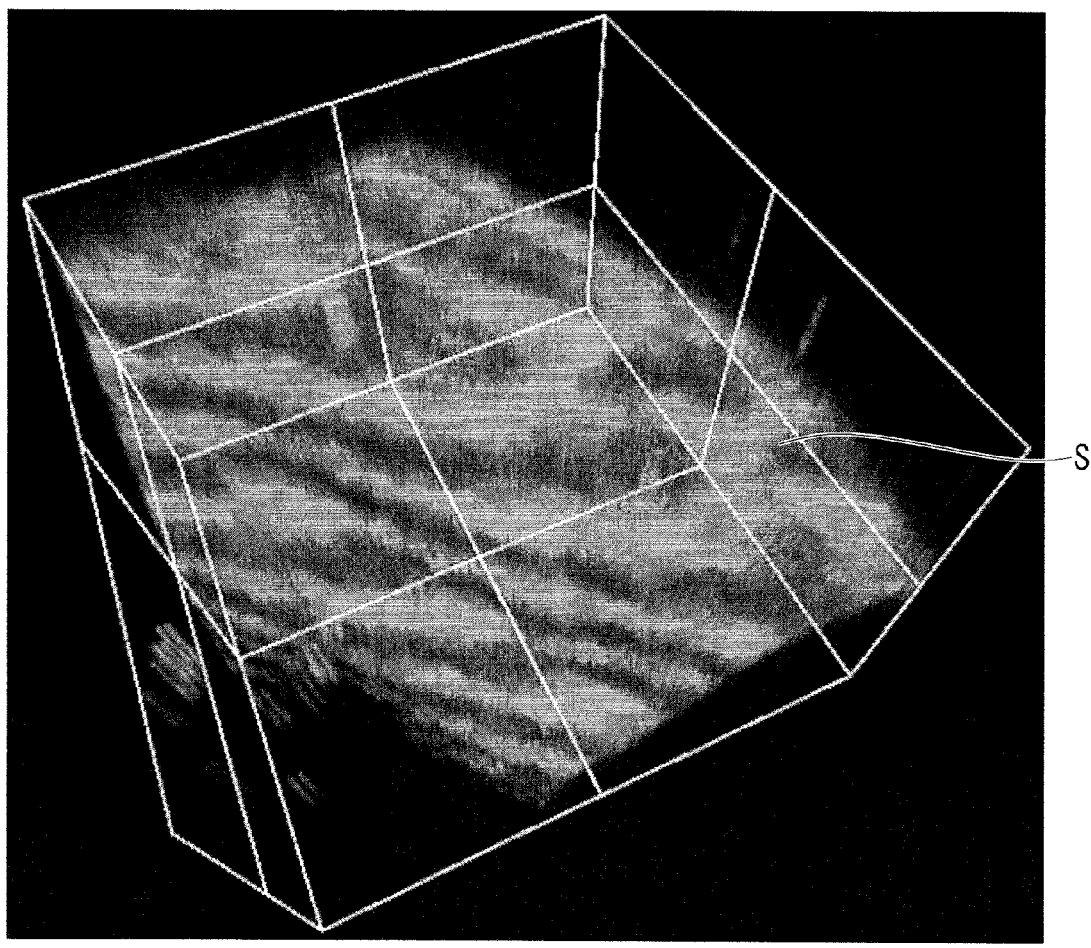
FIG. 8 is a diagram showing another example of a reference image of a sample acquired by the microscope system in FIG. 6.

As shown in FIG. 8, the reference-shape setting portion 15 reads, in the reference image of the sample S acquired by the microscope 3, the coordinates where the sample S exists, and estimates a reference shape approximating the shape of the sample S. In FIG. 8, white frame lines indicate the X-direction, Y-direction, and Z-direction axes.

The resolution setting portion 17 sets a first resolution of the image acquisition portion 9 for acquiring the reference image according to the reference-image image-capturing conditions input by a user, such as the magnification of the objective lens, the observation magnification adjusted by the galvano-zoom-magnification adjusting portion, the observation area in the X and Y directions, the starting position and ending position of the Z stack, the step amount in the Z direction, and the image size. The resolution setting portion 17 sets a second resolution of the image acquisition portion 9 for acquiring the observation image according to observation-image image-capturing conditions input by the user, such as the magnification of the objective lens, the observation magnification adjusted by the galvano-zoom-magnification adjusting portion, the step amount in the Z direction, and the image size.

The user inputs the image-capturing conditions such that the second resolution is higher than the first resolution. For example, the magnification of the objective lens and the image size are set to be larger in the observation-image image-capturing conditions than in the reference-image image-capturing conditions. This increases the resolution in the X and Y directions. For example, the step amount in a Z stack is set to be smaller in the observation-image image-capturing conditions than in the reference-image image-capturing conditions. This increases the resolution in the Z direction. The user may input the image-capturing conditions such that the signal-to-noise ratio of the observation image is higher than the signal-to-noise ratio of the reference image. For example, the scanning speed of the scanner is set to be lower in the observation-image image-capturing conditions than in the reference-image image-capturing conditions.

The observation-area estimating portion 19 sets a three-dimensional observation area according to the reference shape of the sample S, on the reference image, estimated by the reference-shape setting portion 15, on the basis of the second resolution of the image acquisition portion 9 set by the resolution setting portion 17. In this embodiment, for example, as shown in FIG. 9, for the reference image as shown in FIG. 8, the observation-area estimating portion 19 defines, as an observation area B, an area in the reference image where the sample S exists in every observation field of view in the observation image.

Figure 9:
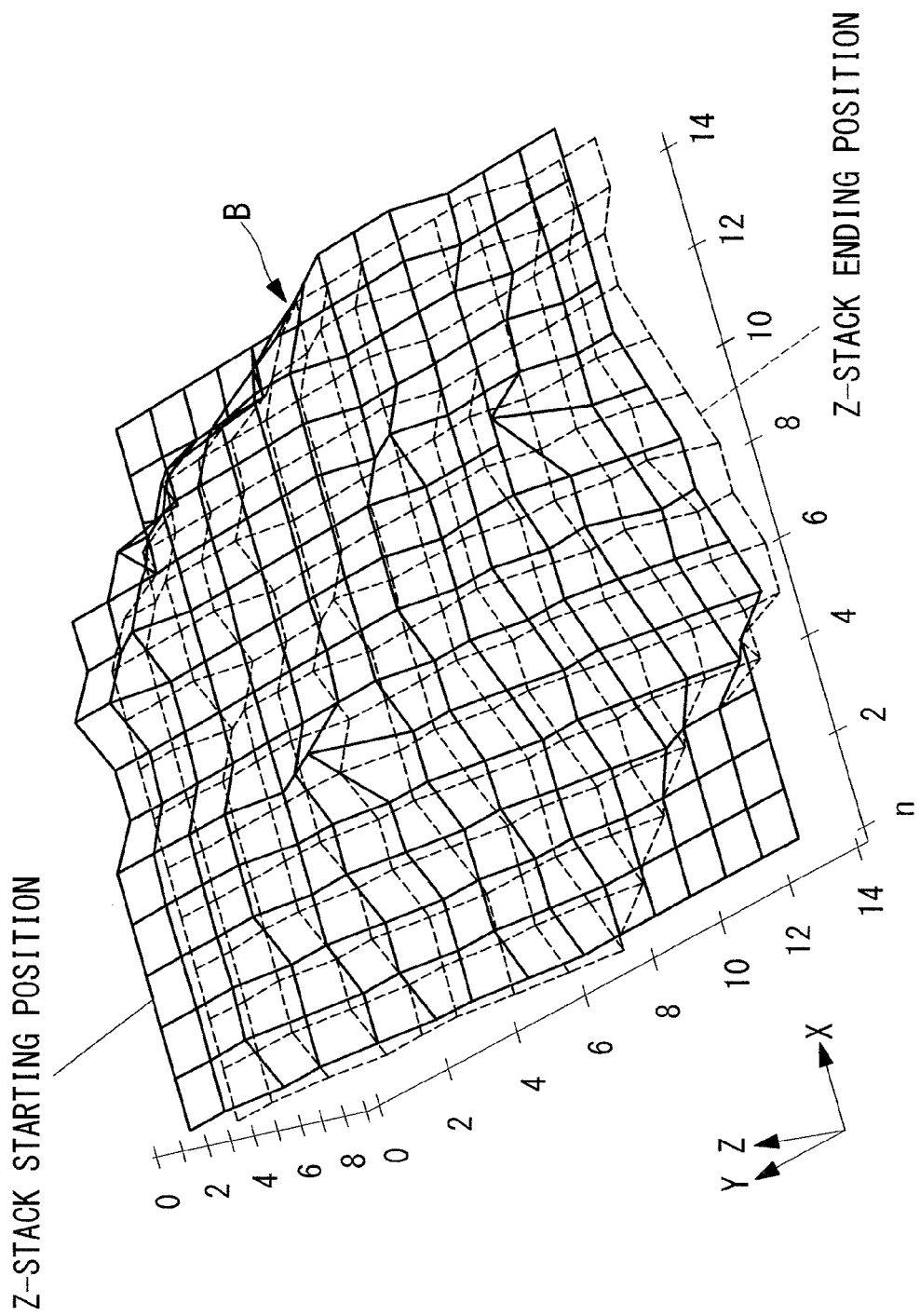
FIG. 9 is a diagram showing an example of an observation area set on the reference image in FIG. 8, according to the reference shape of the sample.

More specifically, as shown in FIG. 9, the observation-area estimating portion 19 sets the observation area B in which each XY position has a specific Z area by sectioning an XY area in the reference image where the sample S exists into the observation fields of view of the image acquisition portion 9 at the second resolution and by estimating Z areas where the sample S exists in the respective observation-field-of-view sections to be the observation area. This is effective when observing a two-dimensionally wide sample S. In FIG. 9, sections shown by solid lines and sections shown by dashed lines show observation fields of view of the image acquisition portion 9 at the second resolution. In FIG. 9, the sections shown by the solid lines indicate Z-stack starting positions, and the sections shown by the dashed lines indicate Z-stack ending positions.

The effects of the thus-configured microscope system and specimen observation method will be described.

To observe a sample S with the microscope system 1 according to this embodiment, first, a user inputs the reference-image image-capturing conditions, such as the magnification of the objective lens, the observation magnification adjusted by the galvano-zoom-magnification adjusting portion, the observation area in the X and Y directions, the starting position and ending position of the Z stack, the step amount in the Z direction, and the image size, and also inputs the observation-image image-capturing conditions, such as the magnification of the objective lens, the observation magnification adjusted by the galvano-zoom-magnification adjusting portion, the step amount in the Z direction, and the image size.

Then, the resolution setting portion 17 sets the first resolution of the image acquisition portion 9 according to the input reference-image image-capturing conditions and sets the second resolution of the image acquisition portion 9 according to the input observation-image image-capturing conditions.

Then, when the user inputs an instruction to acquire a reference image, the control unit 5 controls the revolver, the galvano-zoom-magnification adjusting portion, and the like, and controls the XY-stage-moving portion 13 and the Z-position moving portion 11 according to the reference-image image-capturing conditions, and then, the image acquisition portion 9 acquires a three-dimensional reference image of the sample S, as shown in FIG. 8 (step S0).

Then, the reference-shape setting portion 15 reads the coordinates where the sample S exists, in the reference image of the sample S acquired by the image acquisition portion 9, and estimates a reference shape approximating the shape of the sample S (step S1). By doing so, it is possible to easily and precisely estimate a reference shape approximating the shape of the sample S.

Then, as shown in FIG. 9, the observation-area estimating portion 19 sets a three-dimensional observation area B of the sample S according to the reference shape set by the reference-shape setting portion 15, on the basis of the second resolution of the image acquisition portion 9 set by the resolution setting portion 17 (step S2). In this case, as shown in FIG. 9, by sectioning the XY area in the reference image where the sample S exists into the observation fields of view of the image acquisition portion 9 at the second resolution and by estimating Z areas as an observation area where the sample S exists in the respective observation-field-of-view sections, it is possible to set a precise observation area for a sample S having different thicknesses in different observation fields of view in the observation image.

Figure 10:
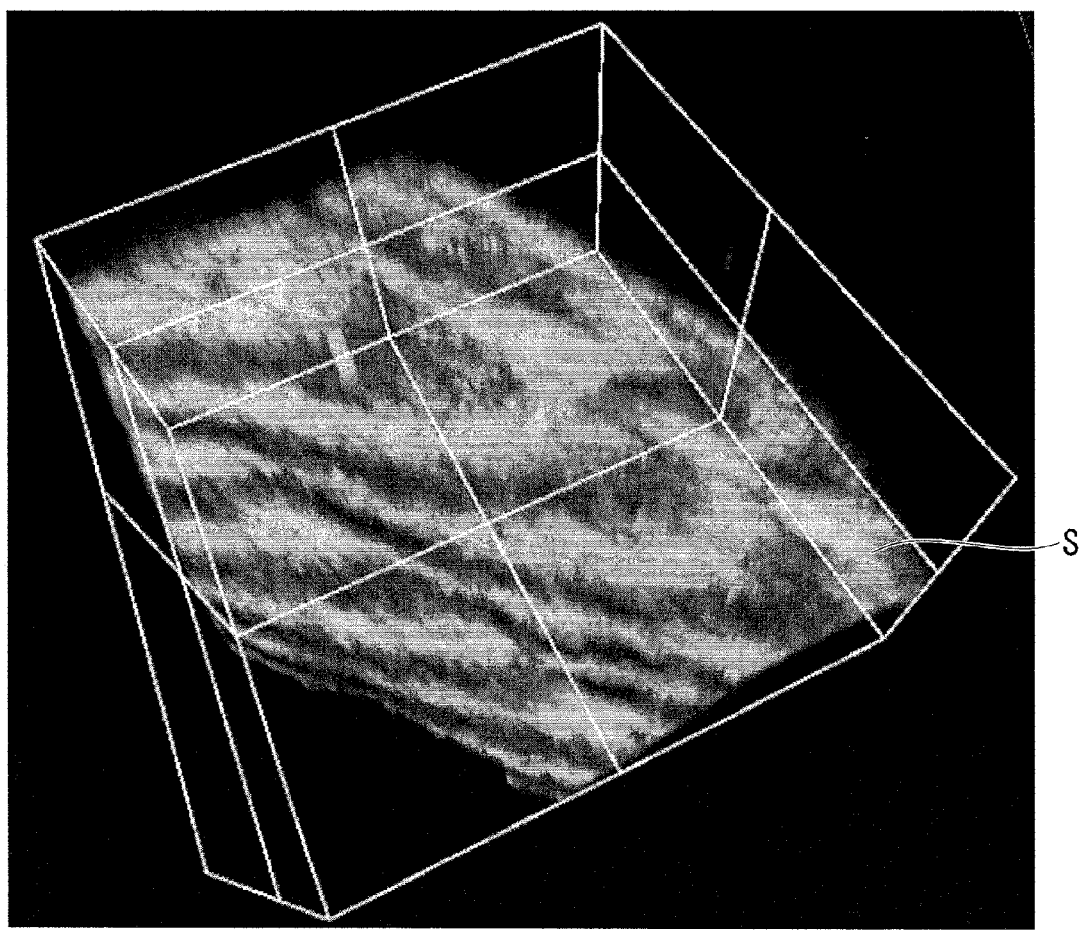
FIG. 10 is a diagram showing an example of an observation image obtained by capturing an image of the observation area in FIG. 9.

Then, when the user inputs an instruction to start observation, similarly to the first embodiment, the control unit 5 controls the revolver, the galvano-zoom-magnification adjusting portion, and the like and controls the Z-position moving portion 11, the XY-stage-moving portion 13, and the image acquisition portion 9 so as to acquire a three-dimensional observation image of the observation area B of the sample S set with the observation-area estimating portion 19. As a result, the image acquisition portion 9 generates a three-dimensional image of the sample S in the observation area, as shown in FIG. 10 (step S3).

As has been described above, with the microscope system 1 and the specimen observation method according to this embodiment, as a result of the control unit 5 controlling the microscope 3 so as to acquire an observation image of the observation area B that is set according to the reference shape approximating the shape of the sample S and in which each XY position has a specific Z area, it is possible to efficiently capture an image of only the necessary area of each sample S and, hence, to easily and quickly acquire a three-dimensional observation image of the sample S.

In this case, by estimating the reference shape of the sample S from the reference image, the necessary observation area can be precisely set without taking time. By acquiring the reference image at a low resolution, the observation area can be easily and efficiently set, and, by acquiring the observation image at a high resolution, detailed observation of a desired observation area is enabled.

In this embodiment, time-lapse observation of the sample S may be performed. In this case, the reference-shape setting portion 15 may set a reference shape of the sample S by using any of the reference images of the sample S acquired by the image acquisition portion 9 during the time-lapse observation. For example, the immediately preceding acquired reference image of the sample S may be used.

By doing so, it is possible to change the reference shape of the sample S to be estimated according to changes in shape of the sample S if the shape of the sample S changes with the elapse of time. Hence, it is possible to perform time-lapse observation while appropriately updating the observation area according to changes in shape of the sample S and reducing the wasted observation area.

In this embodiment, although the image acquisition portion 9 acquires the reference image of the sample S, instead, the reference-shape setting portion 15 may estimate the reference shape of the sample S by using an image of the sample S stored in a recording medium (not shown) in advance as a reference image.

By doing so, it is possible to eliminate the effort of acquiring the reference image. This is effective when observing samples having small individual differences in shape.

In the above-described embodiments, the observation-area estimating portion 19 may define, as the observation area, an area slightly larger than the reference shape by three-dimensionally adding a predetermined value to the reference shape set by the reference-shape setting portion 15.

By doing so, it is possible to acquire a complete three-dimensional observation image of the sample S, even when there is an error in the estimation of the reference shape of the sample S.

In the above-described embodiments, although galvanometer mirrors have been described as an example of the scanner, instead, for example, two scanners having different scanning speeds, such as a resonant scanner and a galvanometer scanner, may be provided in a manner allowing them to be switched between. In this case, when a reference image is acquired, the resonant scanner, which has a higher scanning speed, may be used, and when an observation image is acquired, a galvanometer scanner, which has a lower scanning speed, may be used. By making the reference-image acquisition speed higher than the observation-image acquisition speed, the time for acquiring a reference image is reduced, and thus, a three-dimensional observation image of the sample S can be more quickly and efficiently acquired.

Although the embodiments of the present invention have been described in detail above with reference to the drawings, the specific configurations are not limited to these embodiments, and design changes, etc. that do not depart from the scope of the present invention are also included. For example, the present invention may be applied not only to the above-described embodiments and modifications, but also to embodiments in which the above-described embodiments and modifications are appropriately combined; it is not specifically limited. For example, in the above-described embodiments, although the image acquisition portion 9 that acquires an image by two-dimensionally scanning laser light with a scanner, such as galvanometer mirrors, and by chronologically detecting the brightness data at the respective scanning points with a zero-order-light detector, such as a photomultiplier tube, has been described as an example, an image acquisition portion that acquires an image of the sample S by using a camera may be employed. In such a case, for example, a zoom optical system that can change the magnification of an objective lens with a magnification changing portion and/or can change the projection magnification from the sample surface to the camera may be used as the resolution setting portion.

As a result, the following aspect is read by the above described embodiment of the present invention.

An aspect of the present invention provides a microscope system including: a microscope that acquires an image of a specimen; an approximate-shape setting portion that sets an approximate shape of the specimen; an observation-area setting portion that sets a three-dimensional observation area of the specimen according to the approximate shape set by the approximate-shape setting portion; and a control unit that controls the microscope so as to acquire a three-dimensional observation image of the observation area set by the observation-area setting portion.

According to the above-described aspect, the observation-area setting portion sets a three-dimensional observation area of the specimen according to the approximate shape of the specimen set by the approximate-shape setting portion, and the control unit controls the microscope so as to acquire a three-dimensional image of the observation area.

Hence, compared with a case where images of the respective XY positions, in the specimen, having the same Z area are captured such that the entirety of the specimen is included, it is possible to minimize the wasted observation area and to efficiently capture an image of only the necessary area of each specimen. This enables easy, quick, and efficient acquisition of a three-dimensional observation image of the specimen, regardless of the shape of the specimen or other factors.

In the above-described aspect, the approximate-shape setting portion may set the approximate shape of the specimen from parameters of a spherical or a spheroidal shape that includes substantially the entirety of the specimen.

This configuration makes it possible to easily set an approximate shape of the specimen and, thus, to set the necessary observation area without taking time. This is particularly effective when observing a three-dimensionally thick specimen, such as one having a spherical or spheroidal shape.

In the above-described aspect, the approximate-shape setting portion may estimate the approximate shape of the specimen on the basis of a reference image of the specimen acquired by the microscope.

This configuration enables estimation of the approximate shape of the specimen simply by reading, in the reference image, the coordinates where the specimen exists. Hence, it is possible to easily and precisely estimate the approximate shape of the specimen from the reference image and, thus, to set the necessary observation area without taking time. This is particularly effective when observing a two-dimensionally wide specimen.

In the above-described aspect, the approximate-shape setting portion may estimate the approximate shape of the specimen on the basis of a reference image of the specimen stored in a predetermined recording medium.

This configuration makes it possible to eliminate the effort of acquiring the reference image. This is effective when observing specimens having small individual differences in shape.

In the above-described aspect, the control unit may control the microscope so as to acquire a three-dimensional reference image of the specimen at a first resolution and may control the microscope so as to acquire a three-dimensional observation image of the observation area at a second resolution that is higher than the first resolution.

This configuration enables easy and efficient setting of an observation area from the reference image acquired at a low resolution and detailed observation of a desired observation area with the observation image acquired at a high resolution.

In the above-described aspect, the observation-area setting portion may define, as the observation area, an area in the reference image where the specimen exists in every observation field of view in the observation image.

This configuration enables acquisition of a precise observation image of a specimen having different thicknesses in different observation fields of view.

In the above-described aspect, in time-lapse observation, the approximate-shape setting portion may use any one of previously acquired reference images.

This configuration makes it possible to change the approximate shape of the specimen to be estimated according to changes in shape of the specimen if the shape of the specimen changes with the elapse of time. Hence, it is possible to perform time-lapse observation while appropriately updating the observation area according to changes in shape of the specimen and reducing the wasted observation area.

In the above-described aspect, the control unit may control the microscope so as to acquire the observation image while changing the position at a smaller pitch, in a stepwise manner, in the depth direction of the specimen than in the reference image.

This configuration enables acquisition of a detailed observation image that has a higher resolution in the depth direction of the specimen than the reference image.

In the above-described aspect, the control unit may control the microscope so as to acquire the observation image at a higher resolution in a direction intersecting the depth direction of the specimen than in the reference image.

This configuration enables acquisition of a detailed observation image that has a higher resolution in a direction intersecting the depth direction of the specimen than the reference image.

In the above-described aspect, the control unit may control the microscope so as to acquire the observation image having a higher signal-to-noise ratio than the reference image.

This configuration makes it possible to easily set an observation area from the reference image having a lower signal-to-noise ratio and to precisely observe a desired observation area with the observation image having a higher signal-to-noise ratio.

In the above-described aspect, the microscope may include a scanning part that two-dimensionally scans excitation light across the specimen, and the control unit may control the scanning part so as to acquire the observation image at a lower scanning speed than the excitation-light scanning speed when the reference image is acquired.

This configuration reduces the time for acquiring a reference image and enables quicker and more efficient acquisition of a three-dimensional observation image of the observation area in the specimen.

In the above-described aspect, the observation-area setting portion may define, as the observation area, an area obtained by three-dimensionally adding a predetermined value to the approximate shape.

This configuration enables acquisition of a complete three-dimensional observation image of the specimen, even when there is an error in the estimation of the approximate shape of the specimen.

Another aspect of the present invention provides a specimen observation method including a processes of: setting an approximate shape of a specimen; setting a three-dimensional observation area of the specimen according to the approximate shape; and acquiring a three-dimensional observation image of the three-dimensional observation area.

According to the above-described aspect, a three-dimensional observation image of the observation area of the specimen is acquired according to the approximate shape of the specimen.

Hence, compared with a case where images of the respective XY positions, in the specimen, having the same Z area are captured such that the entirety of the specimen is included, it is possible to minimize the wasted observation area and to efficiently capture an image of only the necessary area of each specimen. This enables easy, quick, and efficient acquisition of a three-dimensional observation image of the specimen, regardless of the shape of the specimen or other factors, and to observe the specimen.

In the above-described aspect, the approximate shape of the specimen may be set from parameters of a spherical or a spheroidal shape that includes substantially the entirety of the specimen.

This configuration makes it possible to easily set an approximate shape of the specimen and, thus, to set the necessary observation area without taking time.

In the above-described aspect, the specimen observation method may further include the processes of acquiring a three-dimensional reference image of the specimen at a first resolution. The approximate shape of the specimen may be estimated on the basis of the three-dimensional reference image, and a three-dimensional observation image of the observation area may be acquired at a second resolution that is higher than the first resolution.

This configuration enables estimation of the approximate shape of the specimen simply by reading, in the reference image, the coordinates where the specimen exists. By acquiring a reference image at a low resolution, it is possible to easily and efficiently set an observation area, and, by acquiring an observation image at a high resolution, it is possible to observe a desired observation area in detail.

REFERENCE SIGNS LIST 1 microscope system
3 microscope
5 control unit
15 reference-shape setting portion (approximate-shape setting portion)
19 observation-area estimating portion (observation-area setting portion)
S0 reference-image acquisition step
S1 reference-shape setting step (approximate-shape setting step)
S2 observation-area setting step
S3 observation-image acquisition step
A reference shape (approximate shape)
B observation area
S sample (specimen)

The invention claimed is:

1. A microscope system comprising:
a microscope;
an approximate-shape setting portion that sets an approximate shape of a specimen to be imaged by the microscope, wherein the approximate-shape setting portion sets the approximate shape of the specimen to be a spherical or a spheroidal shape that includes substantially the entirety of the specimen, according to input parameters of a radius and coordinates of a central position of the spherical or spheroidal shape;
an observation-area setting portion that sets a three-dimensional observation area of the specimen according to the approximate shape set by the approximate-shape setting portion; and
a control unit that controls the microscope so as to acquire a three-dimensional observation image of the observation area set by the observation-area setting portion;
wherein:
the microscope comprises:
an image acquisition portion that collects light from the specimen, detects the collected light, and acquires a slice image based on the detected collected light;
a Z-position moving portion that moves a Z position of a slice image to be acquired by the image acquisition portion in a Z-direction of the observation image along an optical axis of the image acquisition portion; and
an XY-stage-moving portion that horizontally moves the specimen along an X-direction and a Y-direction perpendicular to the optical axis of the image acquisition portion,
the observation-area setting portion sections the three-dimensional observation area of the specimen into plural areas corresponding, respectively, to a size of an observation field of view, and sets a position and size of a Z area specific to an XY position of each of a plurality of observation fields of view corresponding to the plural areas into which the three-dimensional observation area is sectioned, and
the control unit (i) controls the XY-stage-moving portion so as to move the specimen to each of the XY positions of the observation fields of view corresponding to the plural areas into which the three-dimensional observation area is sectioned, (ii) controls the Z-position moving portion such that the Z position at each single XY position to which the specimen is moved is shifted, in a stepwise manner, within the Z area specific to that XY position, and (iii) controls the image acquisition portion to acquire a slice image at each Z position within the Z area specific to the XY position of each of the plurality of observation fields of view to which the specimen is moved, to thereby acquire a plurality of slice images at the respective Z positions within the Z area specific to the XY position of each of the plurality of observation fields of view, and to generate the three-dimensional observation image based on the acquired slice images.

2. The microscope system according to claim 1, wherein the observation-area setting portion defines, as the observation area, an area obtained by three-dimensionally adding a predetermined value to the approximate shape.

3. A specimen observation method used for a microscope system comprising a microscope that includes an image acquisition portion and a control unit that controls the microscope to acquire a three-dimensional observation image of a specimen, the specimen observation method comprising, under control of the control unit:
setting an approximate shape of the specimen, wherein the approximate shape is set to be a spherical or a spheroidal shape that includes substantially the entirety of the specimen, according to input parameters of a radius and coordinates of a central position of the spherical or spheroidal shape;
setting a three-dimensional observation area of the specimen according to the approximate shape;
sectioning the three-dimensional observation area of the specimen into plural areas corresponding, respectively, to a size of an observation field of view, and setting a position and size of a Z area specific to an XY position of each of a plurality of observation fields of view corresponding to the plural areas into which the three-dimensional observation area is sectioned;
horizontally moving the specimen along an X-direction and a Y-direction perpendicular to an optical axis of the image acquisition portion so as to move the specimen to each of the XY positions of the observation fields of view corresponding to the plural areas into which the three-dimensional observation area is sectioned;
moving a Z position of a slice image to be acquired by the image acquisition portion in a Z-direction of the observation image along the optical axis of the image acquisition portion, such that the Z position at each single XY position to which the specimen is moved is shifted, in a stepwise manner, within the Z area specific to that XY position; and
acquiring the three-dimensional observation image of the three-dimensional observation area by controlling the image acquisition portion, at each Z position within the Z area specific to the XY position of each of the plurality of observation fields of view to which the specimen is moved, to collect light from the specimen, detect the collected light, and acquire a slice image based on the detected collected light, to thereby acquire a plurality of slice images at the respective Z positions within the Z area specific to the XY position of each of the plurality of observation fields of view, and generating the three-dimensional observation image based on the acquired slice images.

4. The microscope system according to claim 3, wherein the three-dimensional observation area is defined as an area obtained by three-dimensionally adding a predetermined value to the approximate shape.

* * * * *